April 8, 1941.  E. W. SCHELLENTRAGER  2,237,845
WEIGHT RECORDING MECHANISM FOR DUMP CARS
Filed March 20, 1937  2 Sheets-Sheet 1

INVENTOR.
EUGENE W. SCHELLENTRAGER.
BY
Brockett, Hyde, Higley & Meyer.
ATTORNEYS.

April 8, 1941.   E. W. SCHELLENTRAGER   2,237,845
WEIGHT RECORDING MECHANISM FOR DUMP CARS
Filed March 20, 1937   2 Sheets-Sheet 2
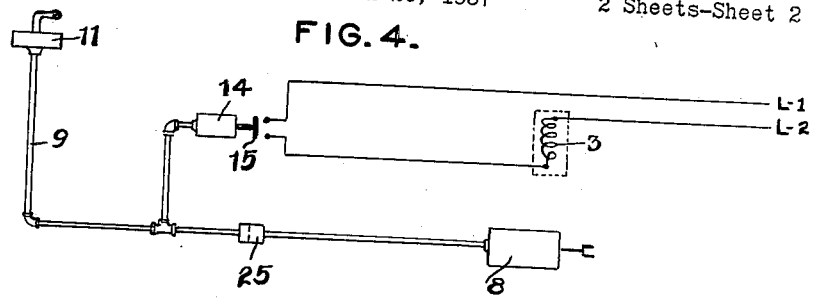
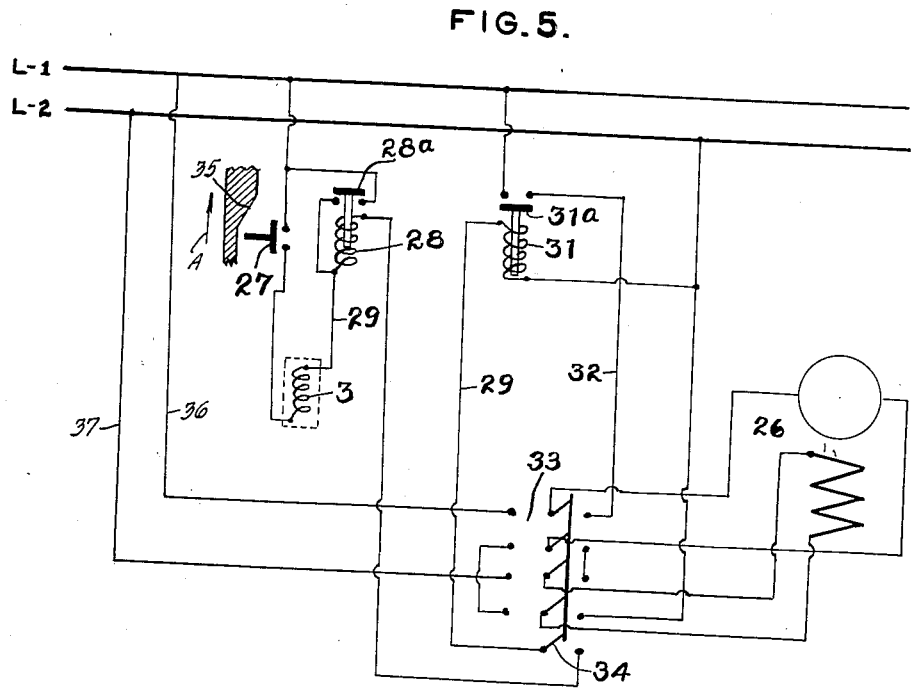
INVENTOR.
EUGENE W. SCHELLENTRAGER.
BY
Brockett, Hyde, Higley + Meyer.
ATTORNEYS.

Patented Apr. 8, 1941

2,237,845

UNITED STATES PATENT OFFICE 2,237,845

WEIGHT RECORDING MECHANISM FOR DUMP CARS

Eugene W. Schellentrager, Shaker Heights, Ohio, assignor to The Atlas Bolt & Screw Company, Cleveland, Ohio, a corporation of Ohio Application March 20, 1937, Serial No. 132,174

5 Claims. (Cl. 265—5)

This invention relates to weight recording means for dump cars. One object of the invention is to provide improved means for automatically producing a record of the weight of each load which the car handles, so that without any attention by the operator the mechanism each day produces its own record of duty performed.

Another object is to provide improved mechanism of this kind in which the weight record is produced or controlled by the operation of dumping the load and preferably at a time when the car is at rest, thereby securing increased accuracy in the record over that produced by weight records made when the car is in motion.

Still another object is to provide recording means of the kind described which enables the operator to collect a mixed load of several materials and produce a record of the load weight at different times, as the several materials are collected, with consequent separate weight records for all materials, but in which, also, a check weight record is automatically produced by the dumping operation, regardless of where the car is dumped.

A further object is to provide an improved weight recording, dumping scale car particularly useful for charging blast furnaces, such as in loading the skip car therefor, or for any other operations where mixed loads are delivered to a receiver and where it is desirable for any reason to automatically produce a record of the weight of all material loaded into and dumped from the car.

Further objects of the invention are in part obvious and in part will appear more in detail hereinafter.

Figure 1:
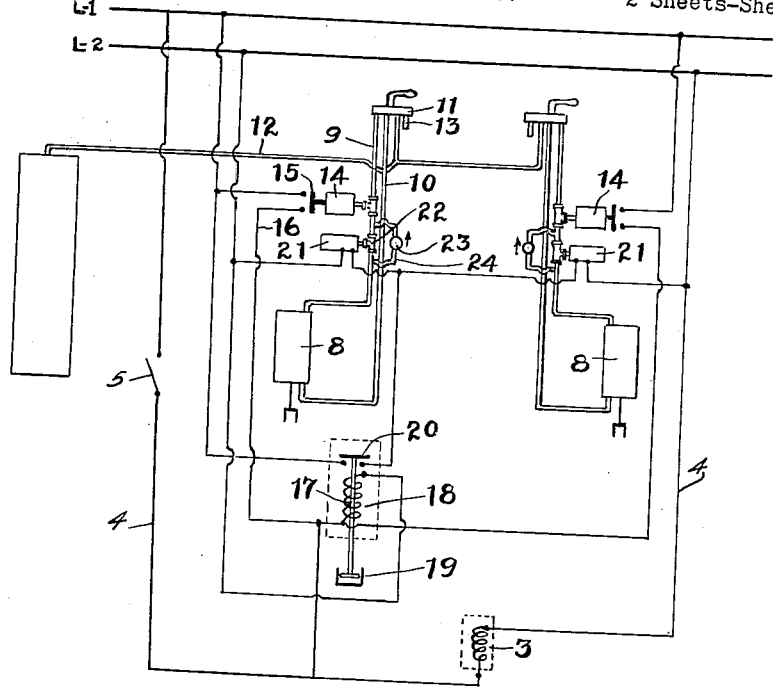
Figures 2, 3:
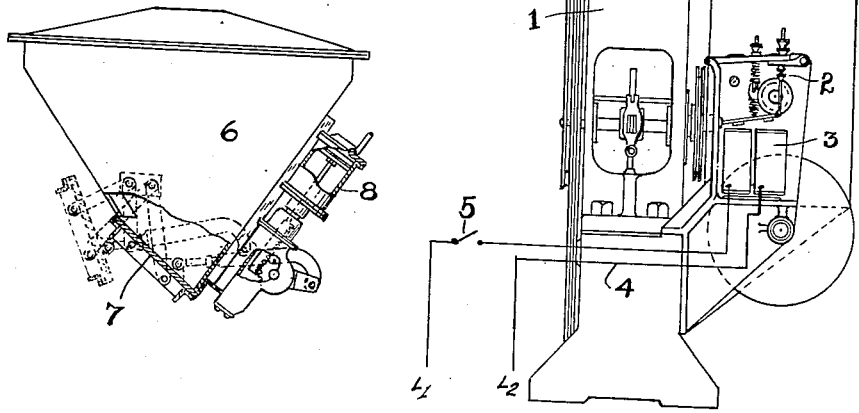

In the drawings, Fig. 1 represents diagrammatically one embodiment of the invention; Fig. 2 is a sectional elevation in conventional form, of the car and its dumping mechanism; Fig. 3 is an elevation, partly broken out and in section, illustrating the recording weighing scale; Fig. 4 illustrates diagrammatically still another embodiment of the invention; and Fig. 5 similarly illustrates another embodiment.

Explanation of the present invention requires no complete illustration or description of the scale car and its operating mechanism or of the weighing and recording devices, all of which are well known. The weighing and recording devices, for example, may be of the form shown in Letters Patent No. 1,329,567, granted February 3, 1920, to Samson D. Wright, to which reference may be had if desirable or necessary. The present application illustrates such devices conventionally, Fig. 3 showing the weighing scale and weight indicating means 1 and the weight recording means at 2, the latter including an energizing or operating coil 3 in an electric circuit 4 capable of being manually closed by the switch 5, whenever the operator desires to produce a weight record. As fully described in the said Wright patent, such operation causes a needle or stylus to puncture a paper web and produce the record.

The dumping car, shown conventionally in Fig. 2, includes a body having one or more hoppers 6 and a movable dumping door 7 actuated by any suitable mechanism, either hand operated or power driven by any suitable motor means, such as an electric motor, the fluid operated cylinder and piston motor 8, or the like.

According to the present invention, the instigation of the car dumping operation, or the presetting of the control devices to cause such operation, automatically causes actuation, even if it be delayed actuation, of the weight recording means. Therefore, in the widest significance of the invention, when the dumping mechanism, such as the movable door, is actuated by the physical effort of the operator, that same effort also actuates, or, at least, controls the actuation of the weight recording means. In a more limited sense, when the dumping operation is produced by power means, such as an electric motor or a fluid pressure piston, the same moving force, whether manual or automatic, that initiates or commands dumping motor operation, also initiates or commands a weight recording operation.

For convenience, and in no sense of limitation, Fig. 1 of the drawings illustrates application of the invention to a double hopper scale car supplied with electric current and using compressed air for door operation. The dumping, load weighing and weight recording devices are of the form shown in Figs. 2 and 3, and because alike for the two hoppers, description of one set will suffice for both, although, of course, it will be understood that one or any number of hoppers may be used.

The cylinder and piston motor 8 for operating the car door is of the double acting variety, having door opening pipe 9 and door closing pipe 10 connected to its chamber on opposite sides of its piston and also to a four-way valve 11 communicating with a reservoir or supply pipe 12 and an exhaust pipe 13. The operating parts are so arranged that whenever the operator moves valve 11 to the door opening position the weight recording mechanism is operated to produce a record. Door opening and weight recording may occur simultaneously but preferably the door opening is somewhat retarded, if only for a fraction of a second, so that flow of the load will not disturb the position of the weight recording needle while puncturing the paper and cause it to damage the record. Any suitable arrangement to produce these results may be employed.

In Fig. 1 the pipe 9 communicates with a small cylinder and piston servo motor 14 which acts as a relay to control operation of the weight recording device, said motor being preferably associated with means for delaying operation of the door opening motor.

As shown, relay motor 14 operates a normally open switch 15 in an electric circuit 16 running from $L_1$ through switch 15 to the recorder operating coil 3 and thence to $L_2$, said last named circuit being in parallel with the circuit 4 before referred to and shown alone in Fig. 3 for convenience in illustration. Consequently, as soon as valve 11 reaches door opening position switch 15 closes and the weight record is produced. At the same time current flows from circuit 16 through the coil 17 of a time delay relay or dumping controller 18, the movable element of which has its motion suitably retarded, as by a dash pot 19. Therefore this relay element moves over slowly and a short time after coil 3 is energized, even as little as a fraction of a second, closes a switch 20 in a circuit from $L_1$ back to $L_2$ through the coil 21 of a solenoid, the core of which is connected to the stem of a normally closed valve 22 in the pipe 9, coil 21 and valve 22 together constituting a final controller for the dumping operation. When said valve opens, pressure flows to the door opening motor cylinder and moves over its piston and the door to the dumping position. A check valve 23 in a bypass 24 around valve 22 prevents flow in said bypass toward the door cylinder but permits flow in the opposite or exhausting direction.

In the arrangement shown in Fig. 4, the air pipe 9 from the operator's valve to the door operating cylinder again communicates with the servomotor 14 which operates switch 15 for energizing the recorder coil 3 and producing the weight record. Pipe 9 also includes time delay means, in this case comprising a choke fitting 25 having a restricted or very fine orifice which sufficiently retards the flow of air through it to the door cylinder, so that operation of the servomotor 14 will certainly occur before pressure will build up sufficiently in the door cylinder to move over its piston. This arrangement secures the same retarding of door operation, but does away with the time delay relay 18 of Fig. 1.

If the choke fitting 25 of Fig. 4 is omitted, the weight record is produced simultaneously with door operation, which might be satisfactory in cases where damage of the record by movement of the stylus in the manner before described is not involved.

Fig. 5 illustrates, in quite simplified form, one arrangement in which all parts are electrically operated. The door operating motor 26 is any suitable reversing motor arranged by rotation in one direction to open the door and by rotation in the opposite direction to close it. Limit stop switches (not shown) of course prevent overrunning in either direction. Normally the motor circuit 32 is open at the switch 31a. Momentary closing of biased-open switch 27 by the operator energizes the coil 28 and closes the switch 28a of a maintaining relay in a circuit 29 from $L_1$ through the recorder coil 3 to $L_2$, thus promptly producing a record. The same circuit includes the coil of a time delay relay 31 like the relay 18 employed in Fig. 1 and adapted after a suitable short interval to close switch 31a in the circuit 32 through the conventional motor reversing switch 33 and motor 26. Switch 33 is in its normal right hand position, Fig. 5, and the motor circuit thus established causes the motor to rotate in the forward direction to open the door and discharge the load. When the load has been discharged the operator throws switch 33 to its left hand position, Fig. 5, and holds it there. Switch 34 is thereby opened, coil of relay 31 is deenergized, and switch 31a opens. The motor circuit is again established, but now in the reverse direction, through wires 36, 37, and the door opens. When this operation is completed the operator releases switch 33, which returns to its original right hand position, also closing switch 34, ready for another operation of switch 27.

While Figs. 1 and 5 show the controllers 11 and 27 as operated by the operator, this is not essential as they, or equivalent controllers, may be automatically operated in any suitable manner, such as by motion of the car as it approaches or reaches dumping position. For example, switch 27 (moving with the car in the direction of arrow A, Fig. 5) may be located on the car to engage an abutment or cam 35 or may be trolley closed for this purpose, which dispenses with any operation by the operator either for dumping or for recording weight. Any of the other arrangements described may be operated in a similar manner.

In all forms described, a weight record is produced each time the car or any hopper thereof, is dumped, all without any attention by the operator other than that necessary to perform his ordinary duties, insuring complete and accurate record of performance of the car.

What I claim is:

1. Apparatus for automatically recording varying weights, comprising a travelling car adapted to receive loads varying in weight dependent upon the will of an operator, means for dumping the car load, power supply means for said dumping means, means adapted when actuated by an operator to connect said power supply means to said dumping means to cause a single operation thereof, means for recording the weight of the car load, and means dependent upon actuation of said connecting means for causing actuation of said recording means.

2. Apparatus for automatically recording varying weights, comprising a travelling car adapted to receive loads varying in weight dependent upon the will of an operator, means for dumping the car load, power supply means for said dumping means, means adapted when actuated by an operator to connect said power supply means to said dumping means to cause a single operation thereof, means for recording the weight of the car load, means dependent upon actuation of said connecting means for causing actuation of said recording means, and means to compel operation of said recording means in advance of operation of said dumping means.

3. Apparatus for automatically recording varying weights, comprising a travelling car adapted to receive loads varying in weight dependent upon the will of an operator, means for dumping the car load, power supply means for said dumping means, means adapted when actuated by an operator to connect said power supply means to said dumping means to cause a single operation thereof, means for recording the weight of the car load, means dependent upon actuation of said connecting means for causing actuation of said recording means, and means sensitive to the flow of power from the power source to the dumping means for compelling operation of said recording means in advance of operation of said dumping means.

4. Apparatus for automatically recording varying weights, comprising a travelling car adapted to receive loads varying in weight dependent upon the will of an operator, means for dumping the car load, power supply means, an operative connection therefrom to said dumping means and including an operator operated controller, a relay, and a final controller, means for recording the weight of the car load, an operator for said recording means and a dumping controller both sensitive to operation of said relay, and an operative connection from said dumping controller to said final controller to cause operation of the dumping means upon operation of the recording means in response to relay operation.

5. Apparatus for automatically recording varying weights, comprising a travelling car adapted to receive loads varying in weight dependent upon the will of an operator, means for dumping the car load, power supply means, an operative connection therefrom to said dumping means and including an operator operated controller, a relay, and a final controller, means for recording the weight of the car load, an operator for said recording means and a dumping controller both sensitive to operation of said relay, means for retarding operation of said dumping controller upon energization of said relay, and an operative connection from said dumping controller to said final controller to cause operation of the dumping means upon operation of the recording means in response to relay operation.

EUGENE W. SCHELLENTRAGER.